(12) United States Patent
Pieschel et al.

(10) Patent No.: US 11,424,618 B2
(45) Date of Patent: Aug. 23, 2022

(54) CONVERTER, ARRANGEMENT COMPRISING A CONVERTER AND METHOD FOR OPERATING SAME

(71) Applicant: Siemens Aktiengesellschaft, Munich (DE)

(72) Inventors: Martin Pieschel, Altdorf (DE); Dominik Schuster, Diespeck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/600,924

(22) PCT Filed: Mar. 17, 2020

(86) PCT No.: PCT/EP2020/057263
§ 371 (c)(1),
(2) Date: Oct. 1, 2021

(87) PCT Pub. No.: WO2020/200760
PCT Pub. Date: Oct. 8, 2020

(65) Prior Publication Data
US 2022/0149621 A1    May 12, 2022

(30) Foreign Application Priority Data

Apr. 2, 2019  (EP) .................................. 19166799

(51) Int. Cl.
*H02M 5/458*   (2006.01)
*H02M 1/10*    (2006.01)
(Continued)

(52) U.S. Cl.
CPC .................... *H02J 3/02* (2013.01); *H02J 3/46* (2013.01); *H02M 1/007* (2021.05);
(Continued)

(58) Field of Classification Search
CPC ........................................................ H02J 3/02
See application file for complete search history.

(56) References Cited

U.S. PATENT DOCUMENTS

| 2012/0044727 | A1* | 2/2012 | Bartsch ................... H02J 3/26 363/131 |
| 2014/0203645 | A1 | 7/2014 | Leu et al. |

(Continued)

FOREIGN PATENT DOCUMENTS

| EP | 2815913 A1 | 12/2014 |
| WO | WO 2012-152619 A2 | 11/2012 |
| WO | WO 2013-120675 A2 | 8/2013 |

OTHER PUBLICATIONS

PCT International Search Report and Written Opinion of International Searching Authority dated May 20, 2020 corresponding to PCT International Application No. PCT/EP2020/057263 filed Mar. 17, 2020.

*Primary Examiner* — Jared Fureman
*Assistant Examiner* — Esayas G Yeshaw
(74) *Attorney, Agent, or Firm* — Henry M. Feiereisen LLC (57) ABSTRACT

A converter has a plurality of partial converters, each partial converter having three-phase converter-side supply connections for parallel connection to the same electrical three-phase supply system and three-phase converter-side output connections with a star point for making contact with a star point of a three-phase output system. The converter-side output connections of the three-phase partial converters are connected in parallel. The partial converters each have a converter module for each partial converter-side three-phase supply connection, and the converter modules each have two or more submodules having their outputs connected in series, and a transformer.

14 Claims, 7 Drawing Sheets

(51) Int. Cl.
  *H02J 3/02*      (2006.01)
  *H02J 3/46*      (2006.01)
  *H02M 7/537*     (2006.01)
  *H02M 1/00*      (2006.01)
  *H02M 7/06*      (2006.01)

(52) U.S. Cl.
  CPC .......... *H02M 1/0077* (2021.05); *H02M 7/06* (2013.01); *H02M 7/537* (2013.01)

(56) References Cited

U.S. PATENT DOCUMENTS

| | | | |
|---|---|---|---|
| 2018/0091037 A1 | 3/2018 | Zhao et al. | |
| 2020/0153359 A1* | 5/2020 | Colak | H02M 7/483 |
| 2021/0143749 A1* | 5/2021 | Lu | H02M 3/01 |
| 2021/0218326 A1* | 7/2021 | Kaneko | H02M 7/003 |

* cited by examiner

CONVERTER, ARRANGEMENT COMPRISING A CONVERTER AND METHOD FOR OPERATING SAME

CROSS-REFERENCES TO RELATED APPLICATIONS

This application is the U.S. National Stage of International Application No. PCT/EP2020/057263, filed Mar. 17, 2020, which designated the United States and has been published as International Publication No. WO 2020/200760 A1 and which claims the priority of European Patent Application, Serial No. 19166799.7, filed Apr. 2, 2019, pursuant to 35 U.S.C. 119(a)-(d).

BACKGROUND OF THE INVENTION

The invention relates to converters, arrangements having converter(s) and methods for operation thereof.

The present invention relates among other things to a converter having a converter subunit, which has: three-phase supply terminals, located at the converter subunit, for connection to an electrical three-phase supply system, and subunit-located three-phase output terminals that form a subunit-located three-phase output system, and a subunit-located starpoint terminal for making contact with a star point of the subunit-located three-phase output system.

Converters having converter subunits of the type described, and hence also the converter subunits per se, are generally known and are marketed and sold for example by Siemens AG under the product name Sinamics Perfect Harmony GH 180.

The object of the invention is to further improve a converter of the type described.

SUMMARY OF THE INVENTION

This object is achieved according to the invention by a converter as set forth hereinafter. Advantageous embodiments of the converter according to the invention are specified in the subclaims.

Accordingly, it is provided according to the invention for the converter to comprise at least one further converter subunit that has subunit-located three-phase supply terminals, subunit-located three-phase output terminals forming a subunit-located three-phase output system, and a subunit-located starpoint terminal for making contact with a star point of the subunit-located three-phase output system, the subunit-located three-phase supply terminals of the converter subunits are connected in parallel, and the parallel subunit-located three-phase supply terminals form converter-located three-phase supply terminals for connection to one and the same three-phase supply system, and the subunit-located three-phase output terminals of the converter subunits are connected in parallel.

A significant advantage of the converter according to the invention consists in the fact that when the converter or converter subunits is/are appropriately controlled the converter can generate selectively a DC voltage or an AC voltage of any desired frequency at the starpoint terminals, and can output a corresponding DC or AC current.

A further advantage of the converter according to the invention consists in the fact that with an appropriate external configuration of the subunit-located three-phase output terminals that are connected in parallel, it is moreover additionally possible to output a three-phase current on the output side.

An additional advantage of the converter according to the invention consists in the fact that the converter subunits do not need a common DC link voltage.

It is advantageous if the one and the further converter subunits each have a respective converter module for each subunit-located three-phase supply terminal.

Each of the converter modules preferably has in each case a module-side three-phase supply terminal, a module-side neutral conductor terminal, a module-side three-phase output terminal and a module-side starpoint terminal.

The neutral conductor terminals of the converter modules that are on the module side are preferably connected to one another and preferably form a subunit-located neutral conductor terminal of the respective converter subunit.

The starpoint terminals of the converter modules that are on the module side are preferably connected to one another and form the subunit-located starpoint terminal of the respective converter subunit.

The three-phase supply terminals that are on the module side preferably each form one of the subunit-located three-phase supply terminals of the respective converter subunit.

The three-phase output terminals that are on the module side preferably each form one of the subunit-located three-phase output terminals of the respective converter subunit.

It is also advantageous if the converter modules each have two or more submodules that are connected electrically in series, a transformer having a primary winding, and, for each submodule, a respective secondary winding.

With the aid of the transformer, it is possible among other things to electrically isolate the subunit-located three-phase terminals from the subunit-located starpoint terminals. The subunit-located three-phase terminals and the subunit-located three-phase output terminals are also electrically isolated from one another, with the result that different reference potentials can be freely predetermined for the two terminal systems. A reference potential may be predetermined for the subunit-located three-phase output terminals for example by way of one or both of the subunit-located starpoint terminals.

Each of the submodules is connected, preferably on the input side, in each case individually to one of the secondary windings of the transformer.

One of the terminals of the primary winding of the transformer preferably forms a three-phase supply terminal on the module side, and another terminal of the primary winding of the transformer preferably forms a neutral conductor terminal on the module side.

The submodules preferably each have a rectifier module, which is connected to a secondary winding of the transformer that is associated with the submodule, a capacitor module that is downstream of the rectifier module, and an inverter module downstream of the capacitor module.

The connection of the submodules electrically in series is preferably based on the cascaded interconnection of the AC voltage terminals of the inverter modules.

The invention furthermore relates to a converter arrangement having at least one converter as described above.

It is advantageous if, in the converter arrangement, the subunit-located three-phase output terminals that are connected in parallel form converter-located three-phase output terminals that are accessible from the outside (externally).

The primary side of a three-to-two single-phase transformer is preferably connected to the converter-located three-phase output terminals.

It is also advantageous if—as an alternative or in addition—the converter-located three-phase output terminals are connected to the primary side of a transformer that is suitable for outputting two AC voltages with a phase offset of 90 degrees on its secondary side.

Preferably, there are connected between the subunit-located starpoint terminal of the one converter subunit and the subunit-located starpoint terminal of the at least one further converter subunit an electrical storage facility and/or an electrical consumer, in particular an electrical resistor.

It is also advantageous if the converter arrangement comprises a generator, in particular an asynchronous machine that provides at least two three-phase output systems on the generator side, one of the three-phase output systems on the generator side is connected to the converter-located three-phase supply terminals, and another three-phase output system on the generator side is connected to the converter-located three-phase output terminals.

In an alternative embodiment variant that is likewise regarded as advantageous, it is provided for the subunit-located three-phase output terminals that are connected in parallel to form internal converter-located three-phase output terminals, and for each of the converter-located three-phase supply terminals to be electrically connected to a respective one of the internal converter-located three-phase output terminals.

The invention furthermore relates to a method for operating a converter as described above. According to the invention, it is provided, using a three-phase supply system that is connected to the converter-located three-phase supply terminals, for a three-phase current to be supplied to the converter and for submodules in the subunits of the converter to be controlled such that an output three-phase current is provided at the subunit-located three-phase output terminals that are connected in parallel and/or a DC voltage or single-phase AC voltage is generated between the subunit-located starpoint terminals.

BRIEF DESCRIPTION OF THE DRAWING

The invention will be explained in more detail below with reference to exemplary embodiments; by way of example.

DETAILED DESCRIPTION OF PREFERRED EMBODIMENTS

In the figures, for the sake of clarity the same reference characters are always used for identical or comparable components.

Figure 1:
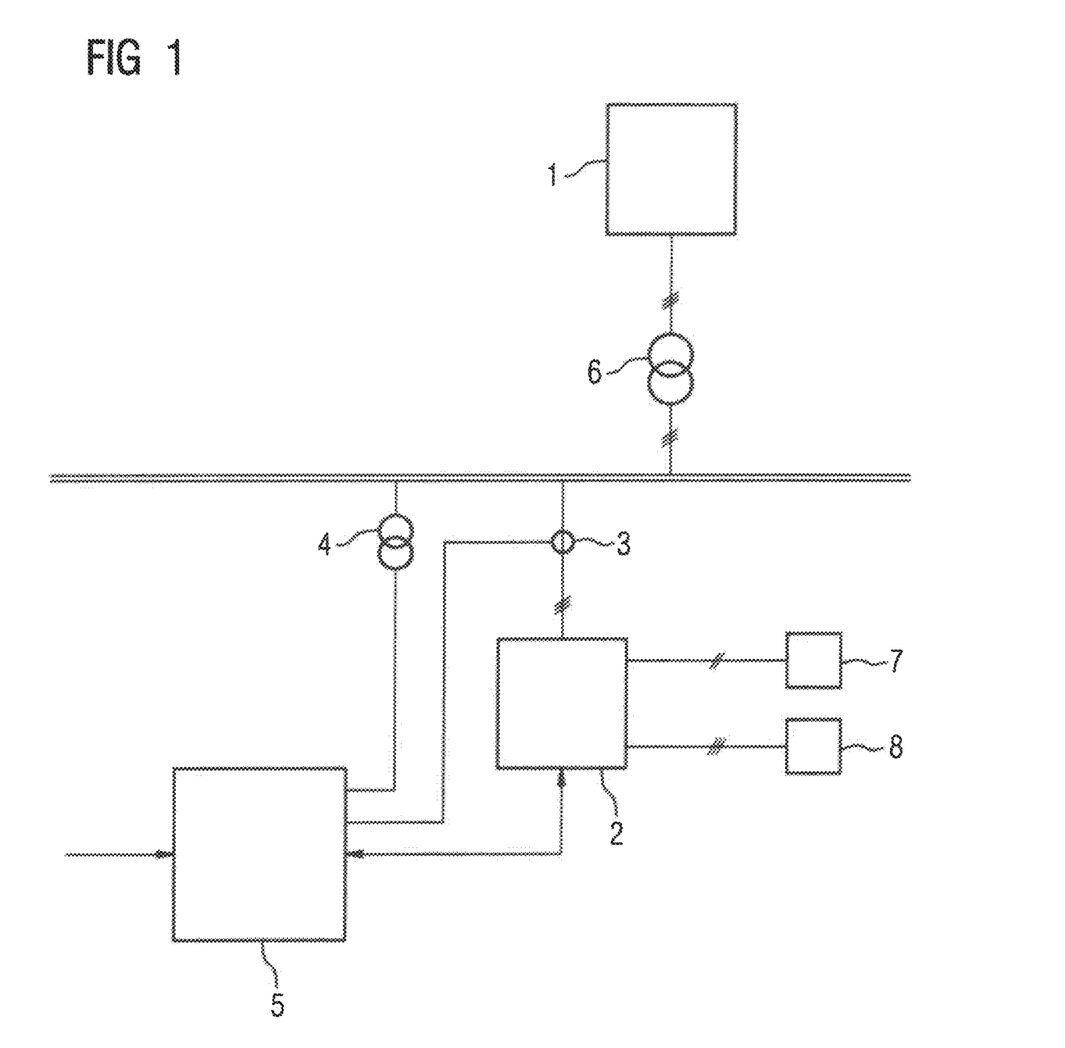
FIG. 1 shows an exemplary embodiment of a converter arrangement according to the invention, with an exemplary embodiment of a converter according to the invention.

FIG. 1 shows an arrangement with an exemplary embodiment of a converter 2 according to the invention that is connected by way of a transformer 6 to an electrical power supply network 1. The current through the converter 2 is measured by means of a current measuring facility 3, and the terminal voltage at the converter 2 is measured by means of a voltage measuring facility 4. The measured values are processed by a converter control unit 5 that monitors and controls the converter 2. It is possible to connect for example a single-phase load 7 and/or a three-phase load 8 to the converter 2. The converter 2 is preferably a multi-level converter.

Figure 2:
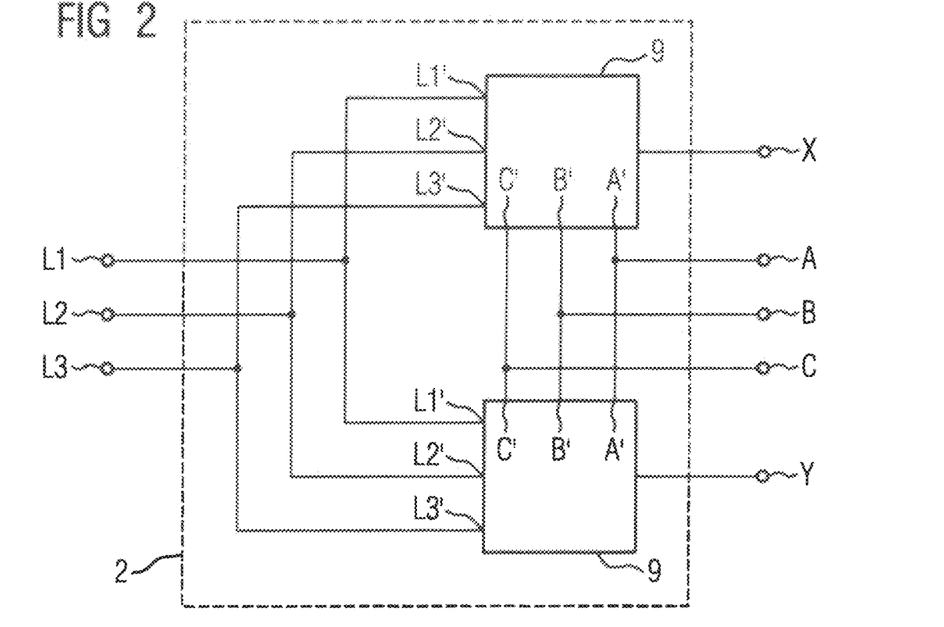
FIG. 2 shows the converter according to FIG. 1 in more detail.

FIG. 2 shows an exemplary embodiment of the converter 2 according to FIG. 1, in more detail. The converter 2 comprises a first converter subunit and a second converter subunit. The two subunits, which are designated by the reference character 9 in the figures, preferably have the same construction, and each comprise subunit-located three-phase supply terminals L1', L2', L3' for connection to an electrical three-phase supply system, subunit-located three-phase output terminals A', B', C' that form a subunit-located three-phase output system, and a subunit-located starpoint terminal X and Y respectively, for making contact with a starpoint of the subunit-located three-phase output system.

In respect of their subunit-located three-phase supply terminals L1', L2', L3', the two converter subunits 9 are connected in parallel. The subunit-located three-phase supply terminals L1', L2', L3' that are connected in parallel form converter-located three-phase supply terminals L1, L2, L3 for connection to one and the same three-phase supply system.

Moreover, in respect of their subunit-located three-phase output terminals A', B', C', the converter subunits 9 are connected in parallel. In the embodiment variant according to FIG. 2, the subunit-located three-phase output terminals A', B', C' form converter-located three-phase output terminals A, B, C that lead to the outside and are accessible from the outside. Thus, the converter-located three-phase output terminals A, B, C according to FIG. 2 may also be designated externally accessible converter-located three-phase output terminals A, B, C.

Depending on control of the converter subunits 9 by the converter control unit 5 according to FIG. 1, the subunit-located starpoint terminals X and Y make it possible to output DC voltage or single-phase AC voltage. The frequency of the single-phase AC voltage depends on control of the converter 2 by the converter control unit 5, and is adjustable as desired from the outside, over a broad range.

The same applies to the three-phase voltage that is output at the converter-located three-phase output terminals A, B, C, the frequency of which is likewise dependent on control of the converter by the converter control unit 5, and is thus likewise adjustable as desired from the outside over a broad range. The frequency of the three-phase voltage may differ from the frequency of the single-phase AC voltage at the starpoint terminals X and Y and from the frequency of the three-phase supply voltage of the three-phase supply system at the converter-located three-phase supply terminals L1, L2, L3.

Figure 3:
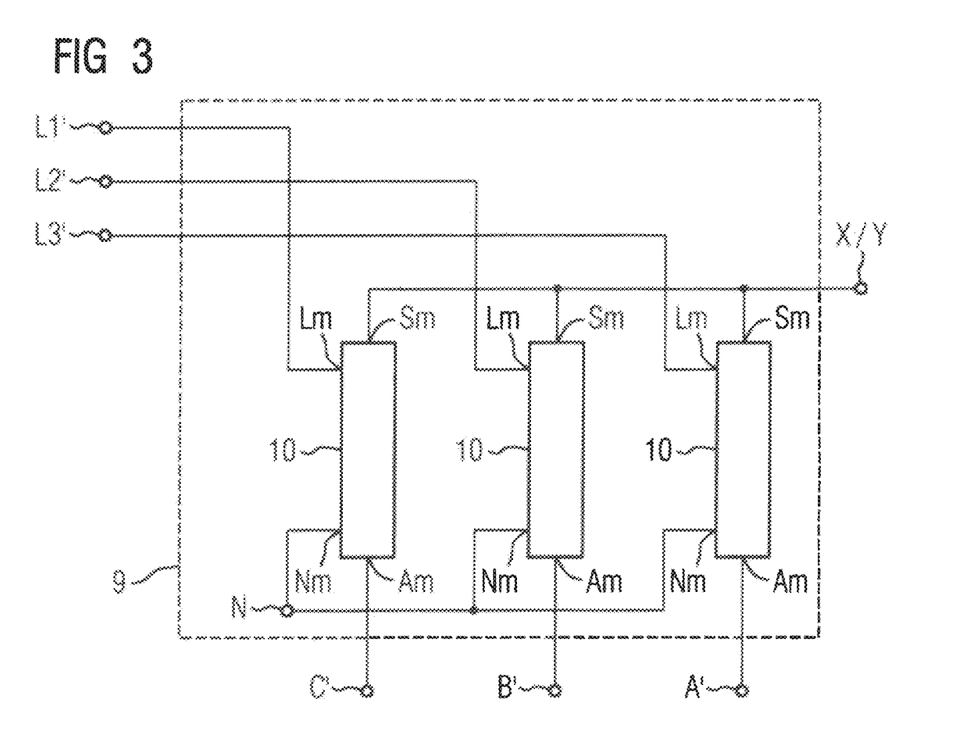
FIG. 3 shows an exemplary embodiment of a converter subunit.

FIG. 3 shows an exemplary embodiment of the converter subunit 9 according to FIG. 2. The converter subunit 9 has a respective converter module 10 for each subunit-located three-phase supply terminal L1', L2', L3'. Each of the converter modules 10 comprises in each case a module-side three-phase supply terminal Lm, a module-side neutral conductor terminal Nm, a module-side three-phase output terminal Am and a module-side starpoint terminal Sm. The neutral conductor terminals Nm of the converter modules 10 that are on the module side are connected to one another and form a subunit-located neutral conductor terminal N of the converter subunit 9.

The starpoint terminals Sm of the converter modules 10 that are on the module side are connected to one another and form the subunit-located starpoint terminal X and Y respectively of the converter subunit 9. The three-phase supply terminals Lm that are on the module side each form one of the subunit-located three-phase supply terminals L1', L2', L3' of the converter subunit 9. The three-phase output terminals Am that are on the module side each form one of the subunit-located three-phase output terminals A', B', C' of the converter subunit 9.

Figure 4:
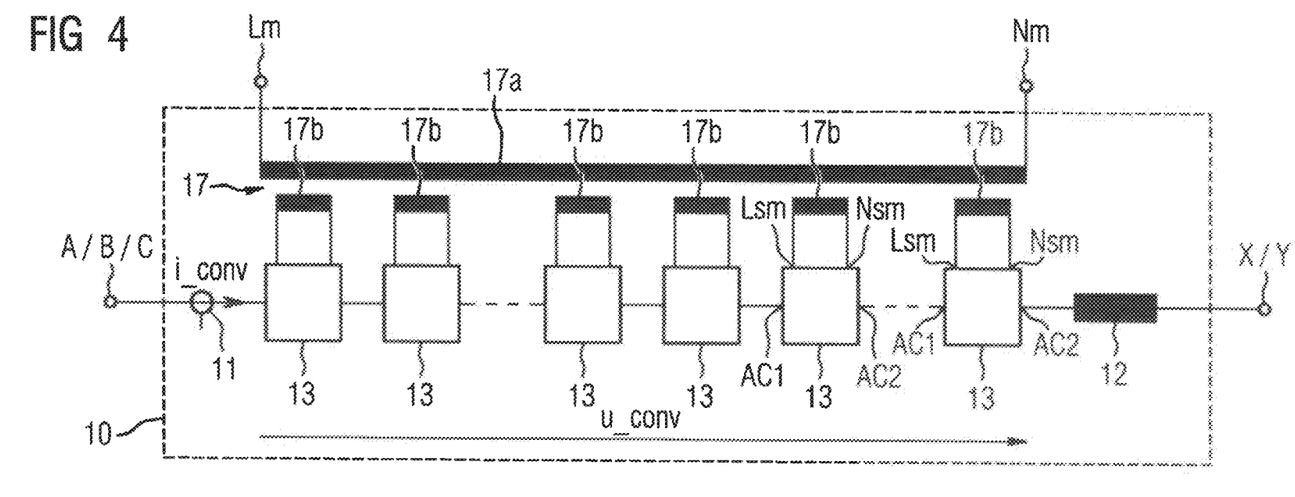
FIG. 4 shows an exemplary embodiment of a converter module.

FIG. 4 shows an exemplary embodiment of the converter module 10 according to FIG. 3. The converter module 10 has two or more submodules 13 that are connected electrically in series, and a transformer 17 having a primary winding 17a and, for each submodule 13, a respective secondary winding 17b. On the input side, each of the submodules 13 is connected, in each case individually, to one of the secondary windings 17b of the transformer 17.

One of the terminals of the primary winding 17a of the transformer 17 forms a three-phase supply terminal Lm on the module side, and the other terminal of the primary winding 17a forms a neutral conductor terminal Nm on the module side.

Also in series with the submodules 13 are a coupling inductor 12 and a current measuring facility 11, and this measures the current i_conv through the converter module 10 and preferably transmits the measured current value to the converter control unit 5 according to FIG. 1.

Figure 5:
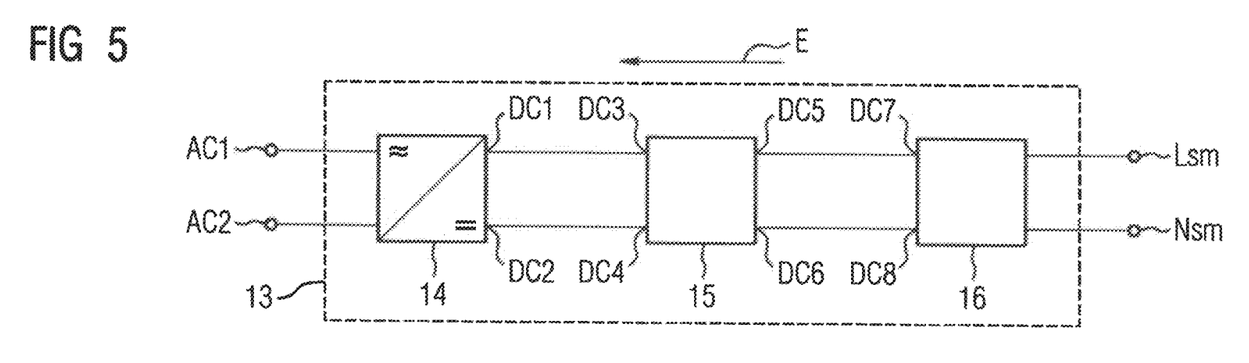
FIG. 5 shows an exemplary embodiment of a submodule.

FIG. 5 shows an exemplary embodiment of the submodule 13 according to FIG. 4.

The submodule 13 has a rectifier module 16, which is connected to a secondary winding 17b of the transformer 17 that is associated with the submodule 13, and is supplied by the secondary winding 17b; the terminals Lsm and Nsm of the submodule 13 serve for this.

Moreover, the submodule 13 has a capacitor module 15 that—as seen in the direction of energy flow, or the direction of energy supply E—is downstream of the rectifier module 16, and an inverter module 14 that is downstream of the capacitor module 15—as seen in the direction of energy flow E. The connection of the submodules 13 electrically in series, shown in FIG. 4, is based on the cascaded interconnection of the AC voltage terminals AC1 and AC2 of the inverter modules 14. The internal terminals of the rectifier module 16, the capacitor module 15 and the inverter module 14 are designated in FIG. 5 by the reference characters DC7 and DC8 (for the rectifier module 16), DC3 and DC4, and DC5 and DC6 respectively (for the capacitor module 15) and DC1 and DC2 (for the inverter module 14).

Figure 6:
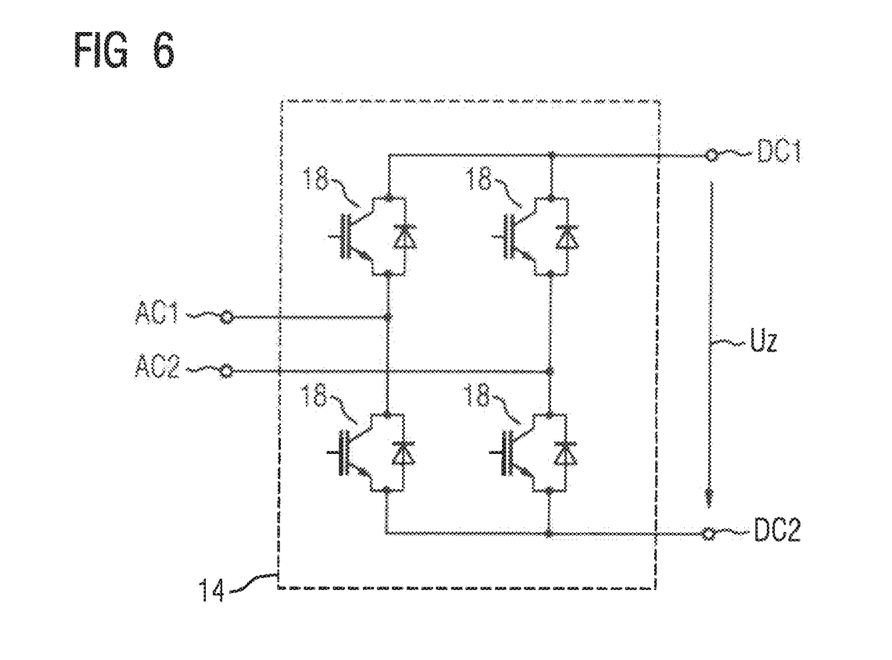
FIG. 6 shows an exemplary embodiment of an inverter module.

FIG. 6 shows an exemplary embodiment of an inverter module 14 according to FIG. 5. The inverter module 14 is formed by an H bridge module comprising four solid-state switches 18. Suitable solid-state switches 18 are for example IGBTs, IGCTs, IEGTs or MOSFETs.

Figure 7:
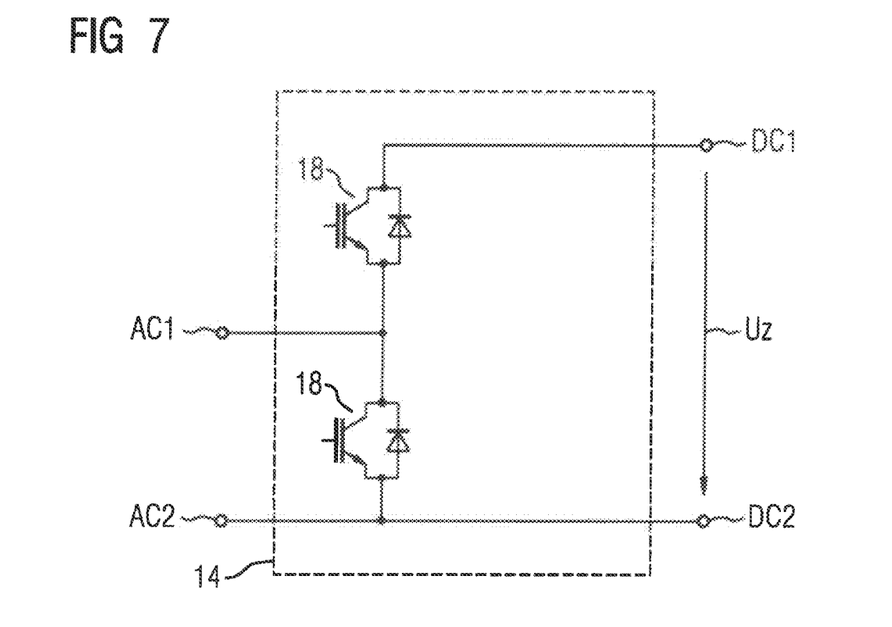
FIG. 7 shows a further exemplary embodiment of an inverter module.

FIG. 7 shows a further exemplary embodiment of an inverter module 14 according to FIG. 5. The inverter module 14 according to FIG. 7 is formed by a half bridge module comprising two sold-state switches 18. Suitable solid-state switches 18 are for example IGBTs, IGCTs, IEGTs or MOSFETs.

Figure 8:
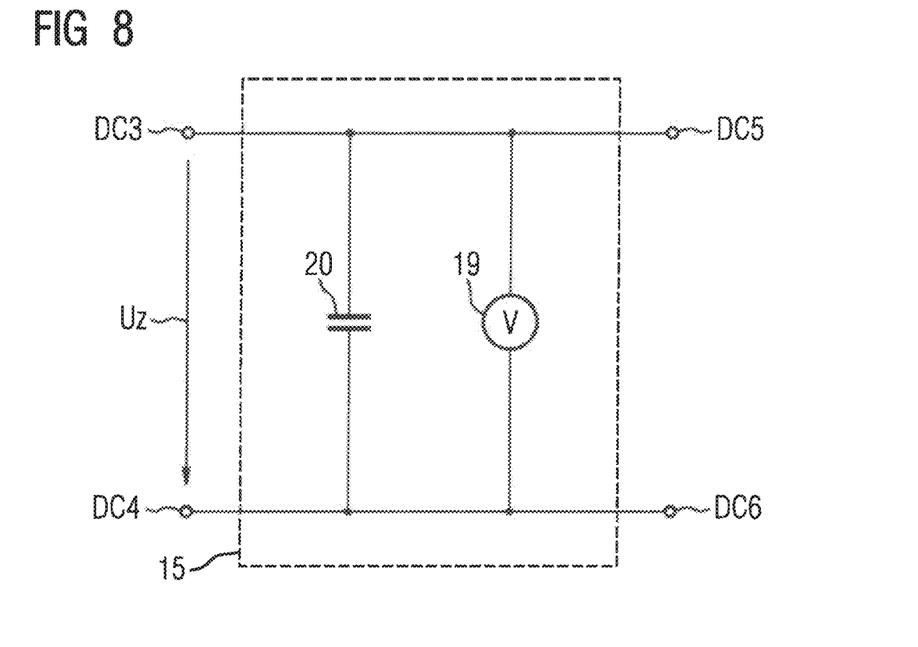
FIG. 8 shows an exemplary embodiment of a capacitor module.

FIG. 8 shows an exemplary embodiment of the capacitor module 15 according to FIG. 5. The capacitor module 15 comprises a capacitor 20, which provides a buffer for a DC link voltage Uz, and a voltage measuring facility 19 that is connected in parallel, measures the DC link voltage Uz and preferably transmits the measured voltage value to the converter control unit 5 according to FIG. 1.

Figure 9:
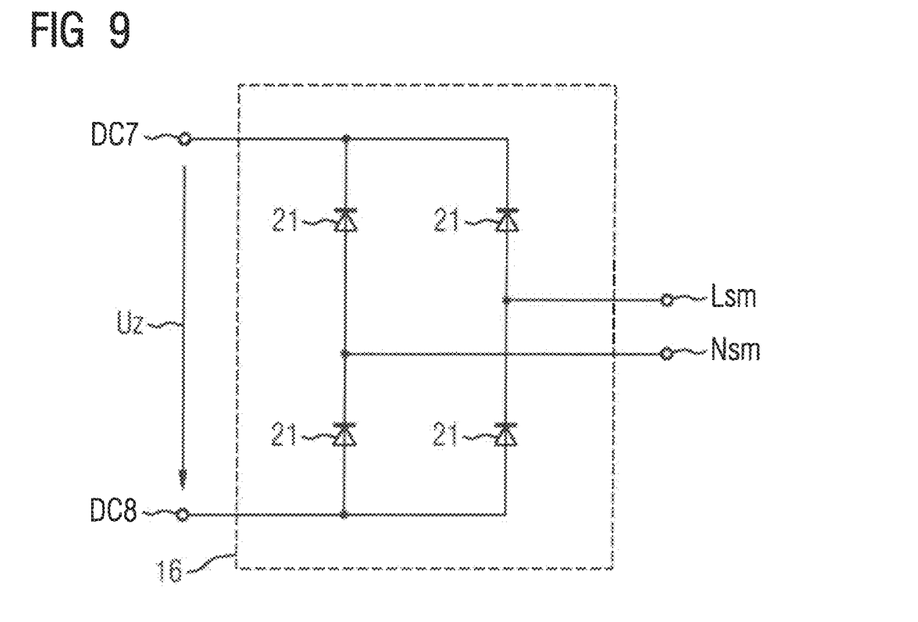
FIG. 9 shows an exemplary embodiment of a rectifier module.

FIG. 9 shows an exemplary embodiment of a rectifier module 16 according to FIG. 5. The rectifier module 16 comprises four diodes 21 for rectifying a single-phase AC voltage. As an alternative, it is also possible to use a three-phase bridge rectifier.

Figure 10:
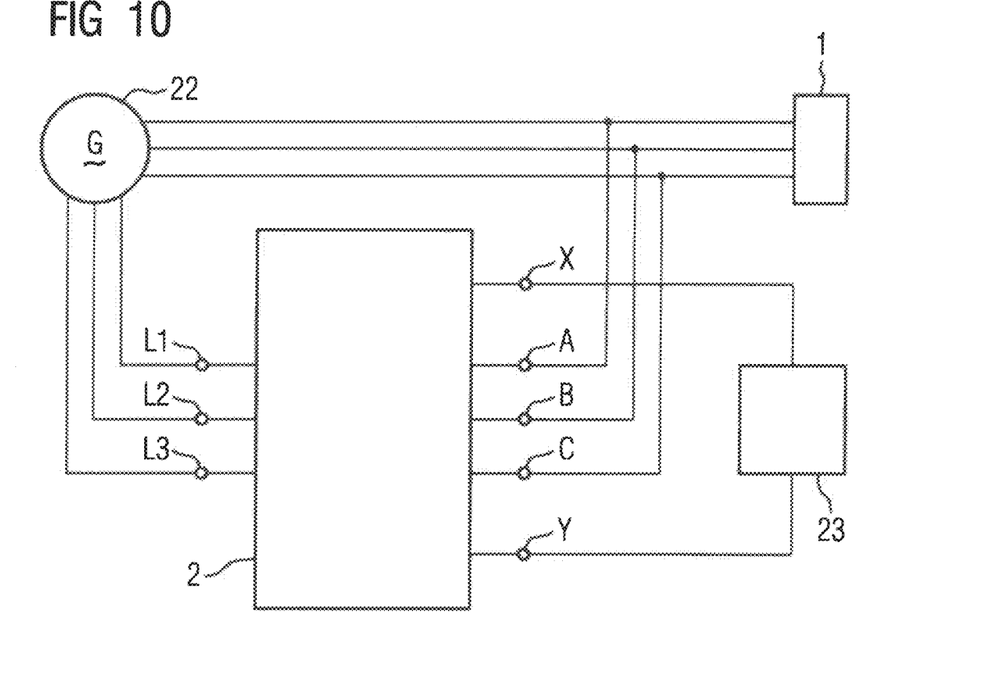
FIG. 10 shows a further exemplary embodiment of a converter arrangement according to the invention, with an exemplary embodiment of a converter according to the invention, FIG. 11 a third exemplary embodiment of a converter arrangement according to the invention, with an exemplary embodiment of a converter according to the invention, and FIG. 12 a further exemplary embodiment of a converter according to the invention.

FIG. 10 shows a further exemplary embodiment of an arrangement with the converter 2 according to FIG. 2. The converter 2 serves to couple a double-feed asynchronous machine 22 to an electrical power supply network 1.

The asynchronous machine 22 has a first three-phase winding that is connected to the converter-located three-phase supply terminals L1, L2, L3 of the converter 2, and a second three-phase winding that is connected to the network 1 in common (or in parallel) with the converter-located three-phase output terminals A, B, C of the converter 2. At the first three-phase winding, the asynchronous machine 22 preferably generates a three-phase voltage at a frequency of for example between 5 and 10 Hz; the second three-phase winding of the asynchronous machine 22 is supplied with the three-phase voltage from the power grid at a frequency of for example 50 Hz.

At its starpoint terminals X and Y, the converter 2 is connected to a resistor and/or an electrical storage facility 23, and these can serve to receive and/or store generator power and hence to support the electrical power supply network 1 in the event of grid faults.

Figure 11:
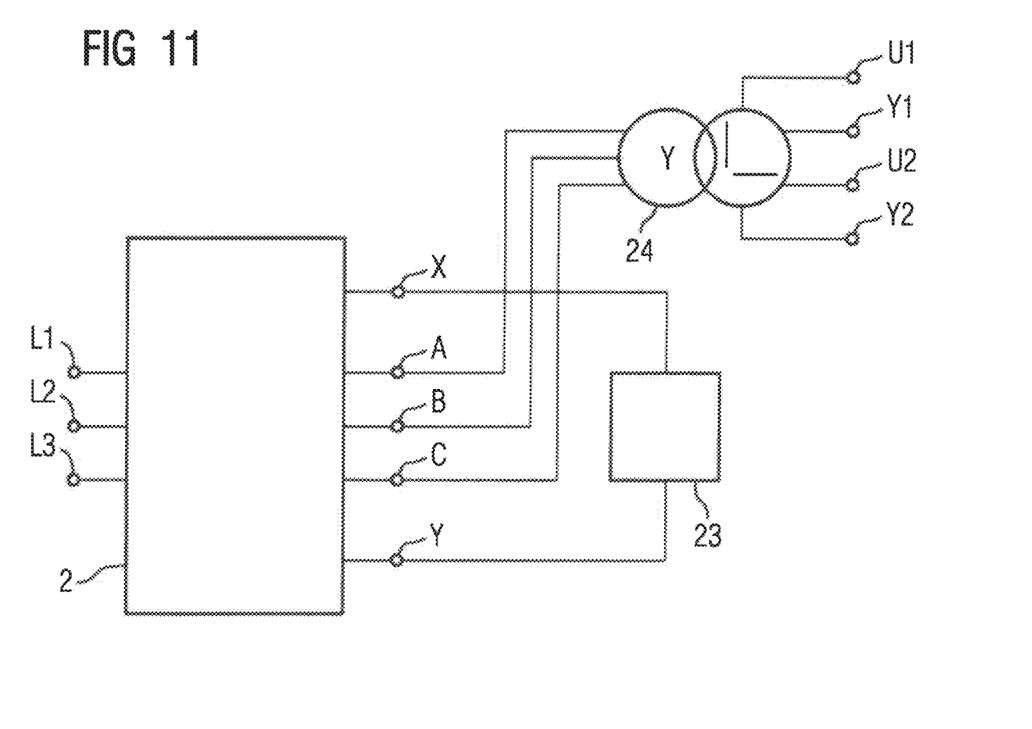

FIG. 11 shows a third exemplary embodiment of an arrangement with the converter 2 according to FIG. 2. The converter 2 is supplied with power at its converter-located three-phase supply terminals L1, L2, L3, to which an electrical three-phase network (not shown in more detail) is connected.

The converter 2 serves to supply for example an electrical rail network, and for this purpose is connected by means of its converter-located three-phase output terminals A, B, C to a three-to-two single-phase transformer 24. The three-to-two single-phase transformer 24 is preferably a Scott or Le Blanc transformer.

On the output side, the three-to-two single-phase transformer 24 has terminals U1 and Y1 for outputting a first AC voltage, and U2 and Y2 for outputting a second AC voltage. The first and second AC voltages preferably have the same frequency, for example 16⅔ Hz, but are at a phase offset of preferably 90 degrees from one another.

At its starpoint terminals X and Y, the converter 2 is connected to a resistor and/or an electrical storage facility 23, and these can serve to receive and/or store generator power and hence to support the rail network side or the electrical rail network in the event of network faults.

Figure 12:
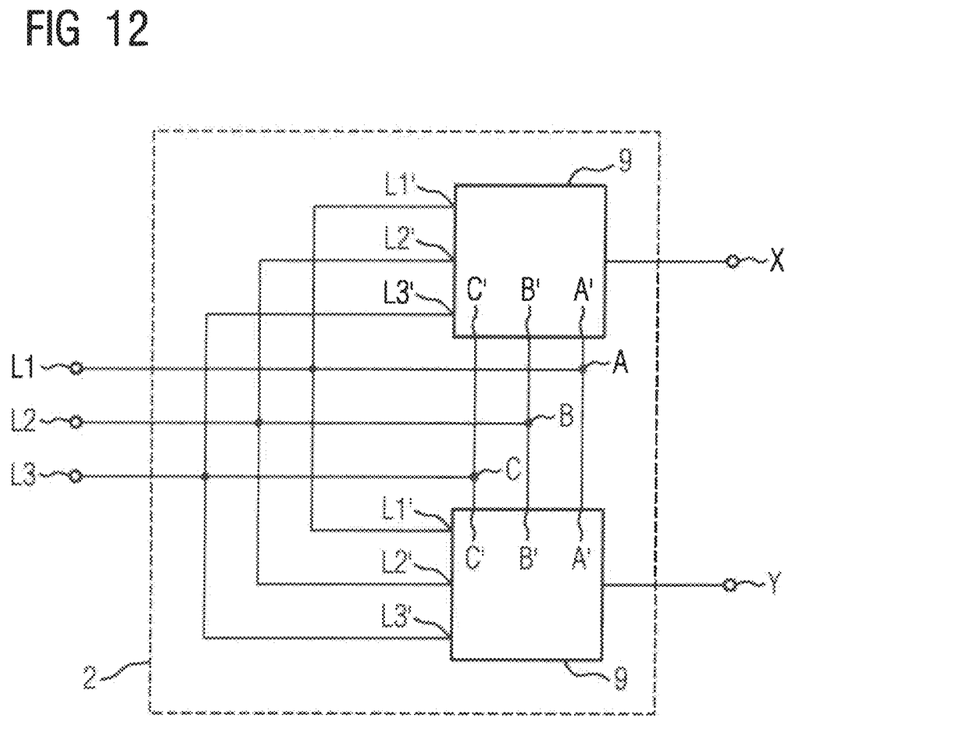

FIG. 12 shows a further exemplary embodiment of a converter 2 according to the invention in more detail. The converter 2 according to FIG. 12 comprises a first converter subunit and a second converter subunit, and corresponds to the converter 2 according to FIG. 2, except that the subunit-located three-phase output terminals A', B', C', which are connected in parallel, form internal converter-located three-phase output terminals A, B, C that are connected to the converter-located three-phase supply terminals L1, L2, L3—in other words the subunit-located three-phase supply terminals L1', L2', L3', which are likewise connected in parallel.

Thus, it is possible from the outside to access or configure the converter-located three-phase supply terminals L1, L2, L3 and the subunit-located starpoint terminals X, Y, which enable output of a DC voltage or a single-phase AC voltage.

In summary, the invention relates to a converter having a converter subunit that has the following: three-phase supply terminals, located at the converter subunit, for connection to an electrical three-phase supply system, and subunit-located three-phase output terminals that form a subunit-located three-phase output system, and a subunit-located starpoint terminal for making contact with a star point of the subunit-located three-phase output system. According to the invention, it is provided for the converter to comprise at least one further converter subunit that has subunit-located three-phase supply terminals, subunit-located three-phase output terminals forming a subunit-located three-phase output system, and a subunit-located starpoint terminal for making contact with a star point of the subunit-located three-phase output system, for the subunit-located three-phase supply terminals of the converter subunits to be connected in parallel, and for the parallel subunit-located three-phase supply terminals to form converter-located three-phase supply terminals for connection to one and the same three-phase supply system, and for the subunit-located three-phase output terminals of the converter subunits to be connected in parallel, wherein the converter subunits each have a respective converter module for each subunit-located three-phase supply terminal and each of the converter modules has two more submodules that are electrically connected in series on the output side, a transformer.

The converters 2 that have been described by way of example in connection with FIGS. 1 to 12 may, depending on the configuration, make it possible to generate a three-phase voltage and additionally to generate a DC or AC voltage from a three-phase network on the input side, in each case of any desired output frequency, without a common electrical DC link.

Although the invention has been described and illustrated in detail by way of preferred exemplary embodiments, the invention is not restricted by the disclosed examples, and those skilled in the art may derive other variations therefrom without departing from the scope of protection of the invention.

What is claimed is:

1. A converter, comprising:
   a first converter subunit, which comprises
   first three-phase supply terminals for connection to an electrical three-phase supply system,
   first three-phase output terminals that form a first three-phase output system, and
   a first star point terminal configured to contact a star point of the three-phase output system,
   and at least one second converter subunit which comprises
   second three-phase supply terminals connected in parallel with the first three-phase supply terminals to form converter-side three-phase supply terminals which are connected to a common electrical three-phase supply system,
   second three-phase output terminals that form a second three-phase output system, with the second three-phase output terminals connected in parallel with the first three-phase output terminals, and
   a second star point terminal configured to contact the star point of the first three-phase output system,
   the first converter subunit and the at least one second converter subunit each further comprising a respective converter module connected to each of the first three-phase supply terminal and the second three-phase supply terminal, with each respective converter module comprising a transformer having a primary winding and a plurality of secondary windings, and two or more submodules, each submodule having an input connected to a respective one of the plurality of secondary windings in one-to-one correspondence,
   wherein the primary windings of the respective converter modules of the first converter subunit and of the at least one second converter subunit are connected to the first and second three-phase supply terminals in a star connection.

2. The converter of claim 1, further configured to output a DC voltage or a single-phase AC voltage between the first star point terminal and the second star point terminal.

3. The converter of claim 1, each of the converter modules further comprising:
   a module-side three-phase supply terminal,
   a module-side neutral conductor terminal,
   a module-side three-phase output terminal, and
   a module-side star point terminal,
   wherein the module-side neutral conductor terminals of the converter modules of a respective converter subunit are connected to one another and form a neutral conductor terminal of the respective converter subunit,
   wherein the module-side star point terminals of the converter modules of the respective converter subunit are connected to one another and form a star point terminal of the respective converter subunit,
   wherein the module-side three-phase supply terminals each form one of the three-phase supply terminals of the respective converter subunit, and
   wherein the module-side three-phase output terminals each form one of the three-phase output terminals of the respective converter subunit.

4. The converter of claim 1, wherein the primary winding of each transformer of the respective converter module comprises a module-side three-phase supply terminal and a module-side neutral conductor terminal.

5. The converter of claim 1, each of the submodules further comprising a rectifier module connected to a secondary winding of the transformer associated with the submodule, a capacitor module arranged downstream of the rectifier module, and an inverter module arranged downstream of the capacitor module.

6. The converter of claim 1, wherein AC output terminals of the inverter modules are interconnected electrically in series in a cascaded fashion.

7. A converter arrangement, comprising at least one converter according to claim 1.

8. The converter arrangement of claim 7, wherein the second three-phase output terminals connected in parallel with the first three-phase output terminals form converter-side three-phase output terminals, which are connected to a primary side of a three-phase to two single-phase transformer.

9. The converter arrangement of claim 7, wherein the second three-phase output terminals connected in parallel with the first three-phase output terminals form converter-side three-phase output terminals, which are connected to a primary side of a transformer, with a secondary side of the transformer configured to output two AC voltages with a phase offset of 90 degrees.

10. The converter arrangement of claim 7, further comprising an electrical storage facility connected between the first star point terminal and the second star point terminal.

11. The converter arrangement of claim 7, further comprising an electrical load connected between the first star point terminal and the second star point terminal.

12. The converter arrangement of claim 7, further comprising a generator, in particular an asynchronous machine, providing at least two generator-side three-phase output systems, wherein one of the at least two generator-side three-phase output systems is connected to the three-phase supply system, and another of the at least two generator-side three-phase output systems is connected to the parallel-connected first and second three-phase output terminals.

13. The converter arrangement of claim 7, wherein the second three-phase output terminals connected in parallel with the first three-phase output terminals form converter-side three-phase output terminals, and wherein each of the converter-side three-phase supply terminals is electrically connected to a respective one of the converter-side three-phase output terminals.

14. A method for operating a converter according to claim 1, said method comprising:

supplying a three-phase current to the common electrical three-phase supply system, and controlling the one or more submodules of the first and second converter subunits so as to provide a three-phase output current at the parallel-connected first and second three-phase output terminals or to generate a DC voltage or a single-phase AC voltage between the first star point terminal and the second star point terminal.

* * * * *